March 31, 1925.
G. A. ANDERSON
1,531,639
CAR TRUCK SIDE FRAME
Filed Oct. 17, 1922    5 Sheets-Sheet 2
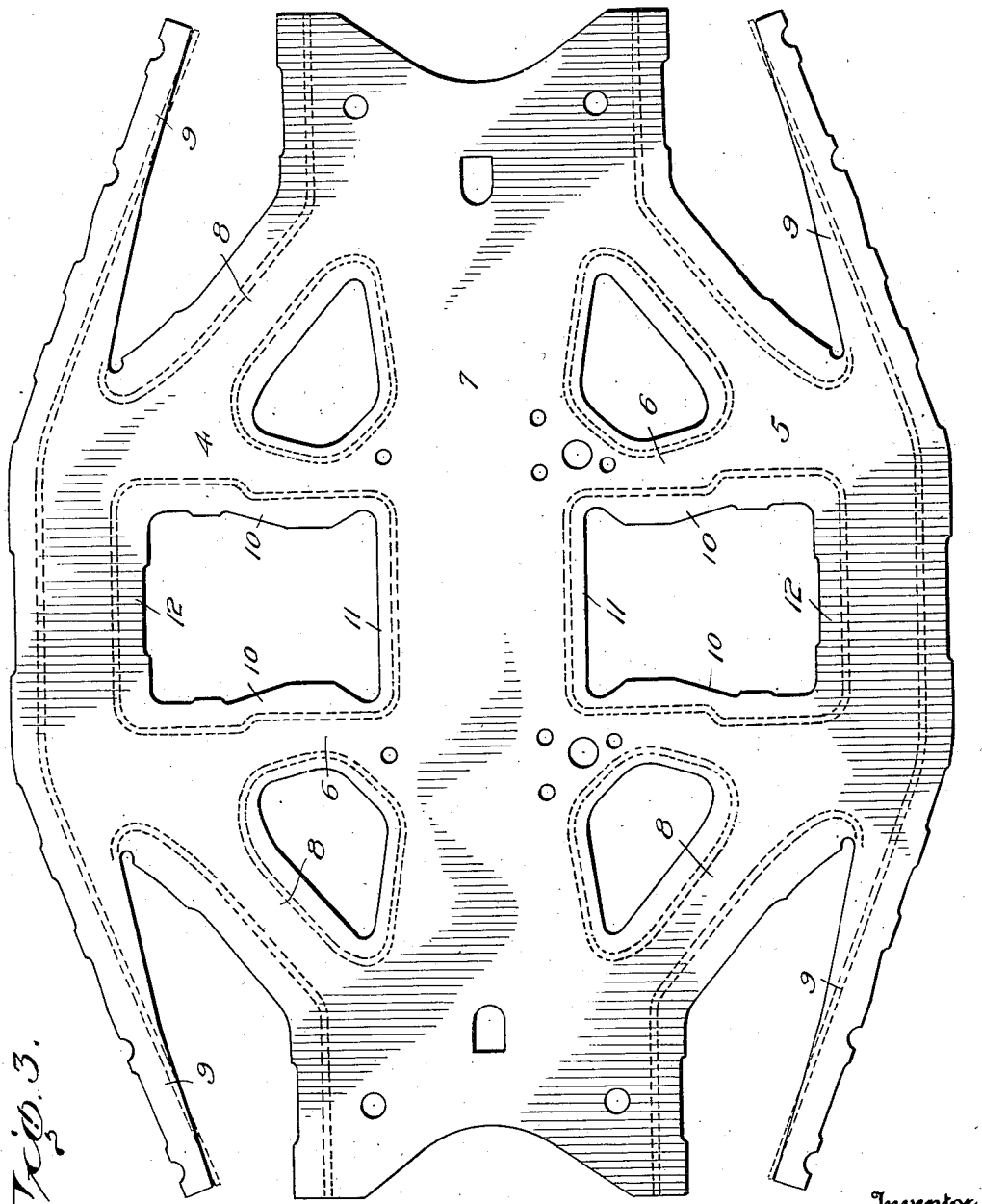
Fig. 3.

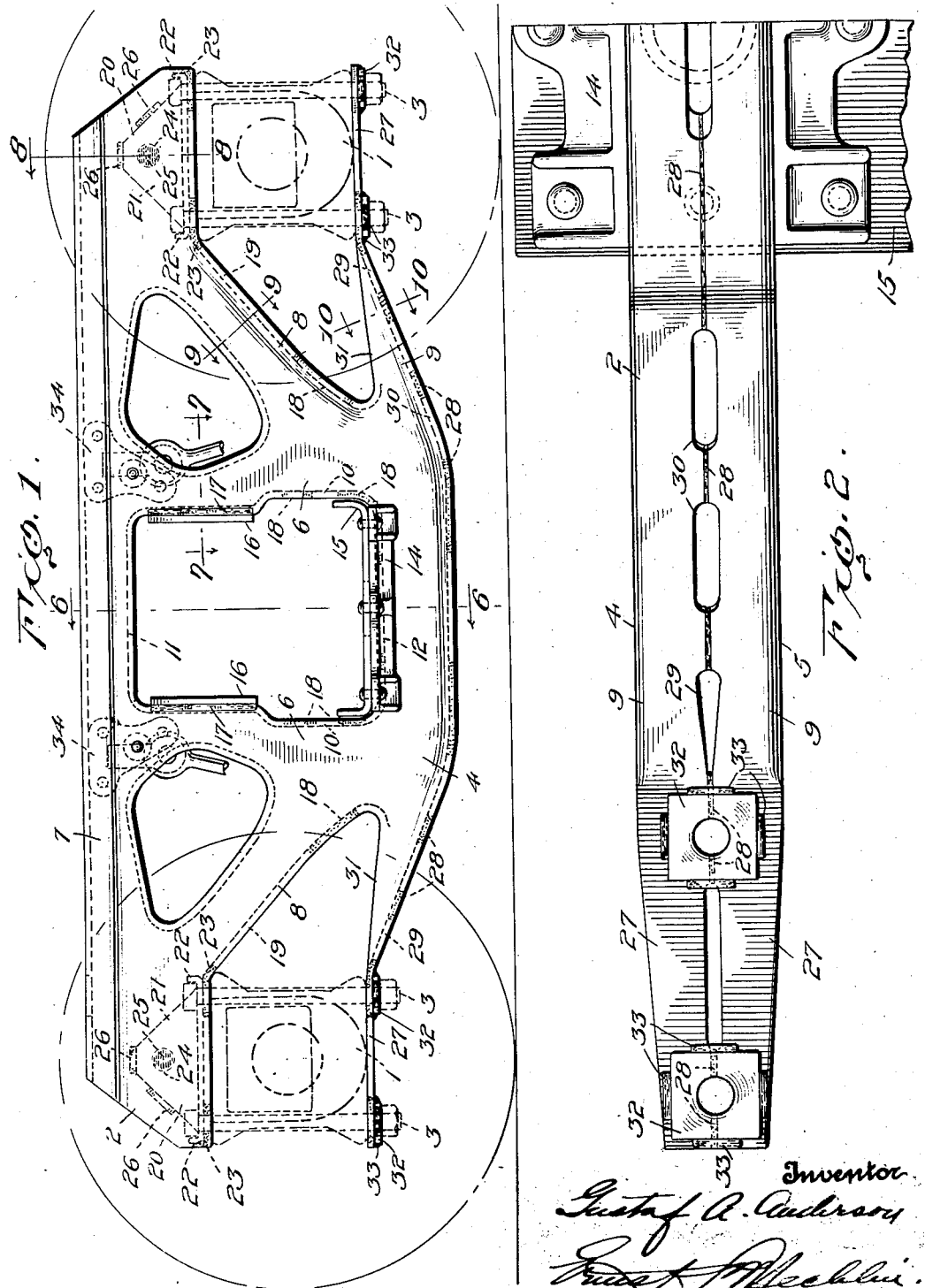

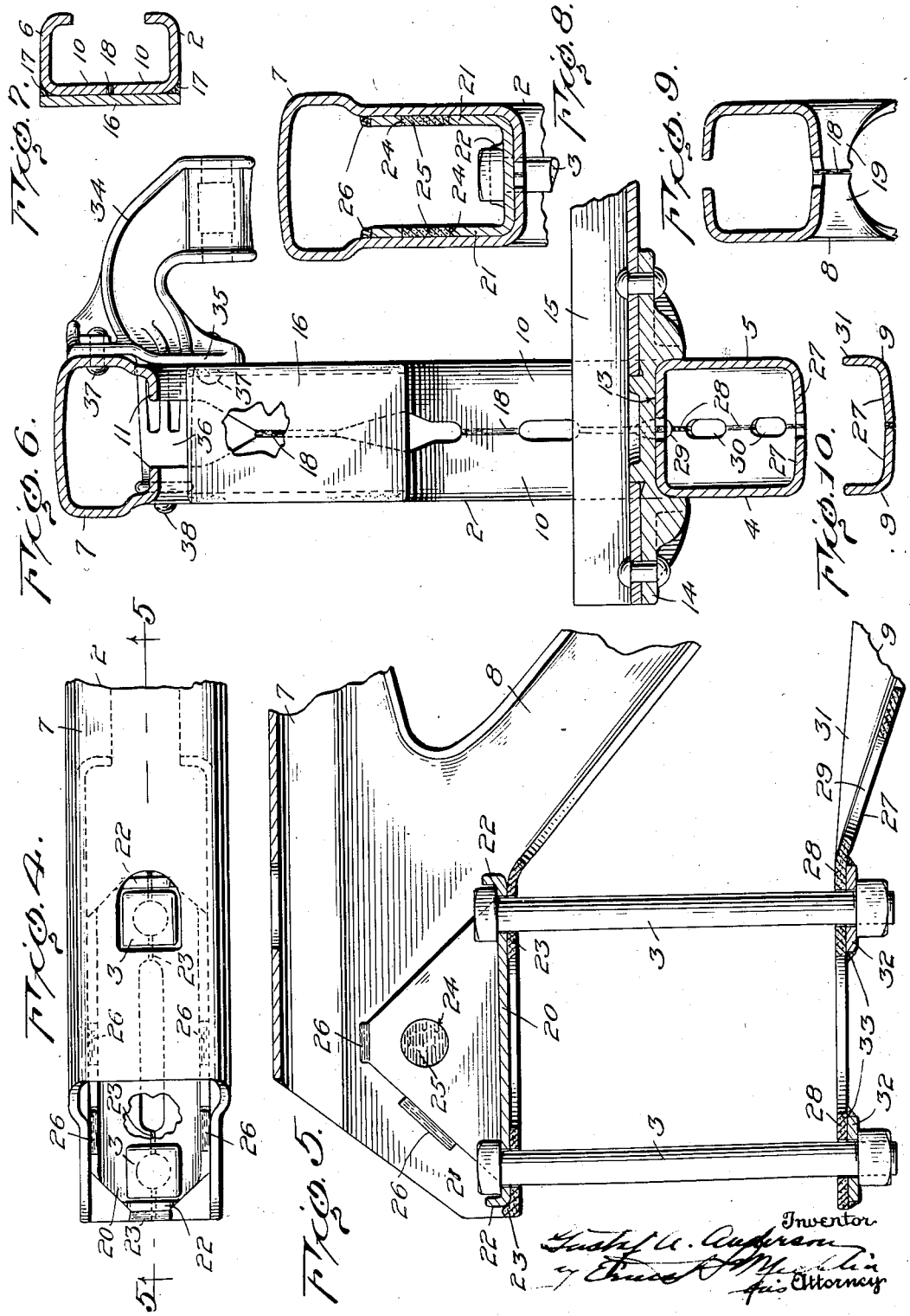

March 31, 1925. 1,531,639
G. A. ANDERSON
CAR TRUCK SIDE FRAME
Filed Oct. 17, 1922  5 Sheets-Sheet 4
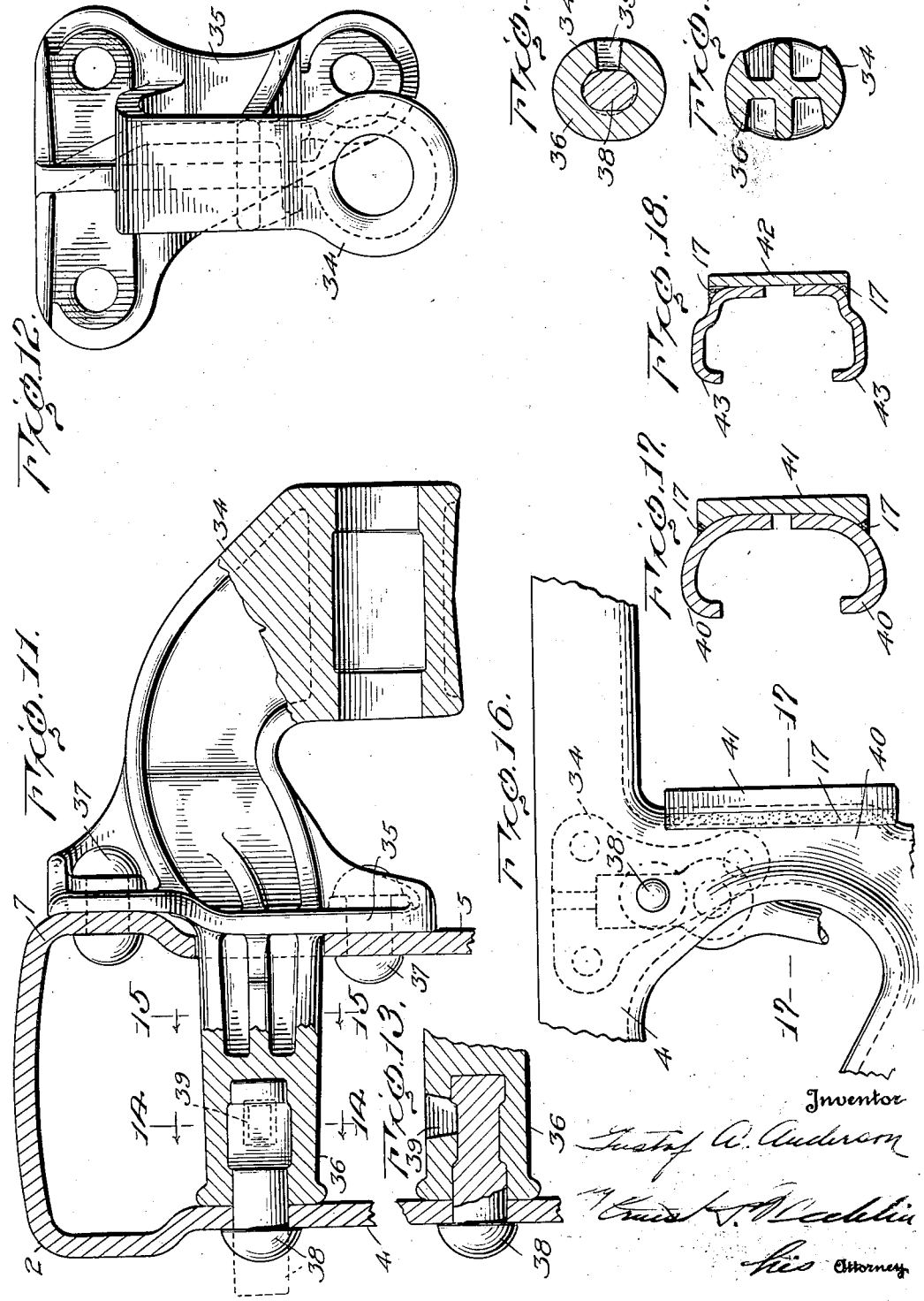

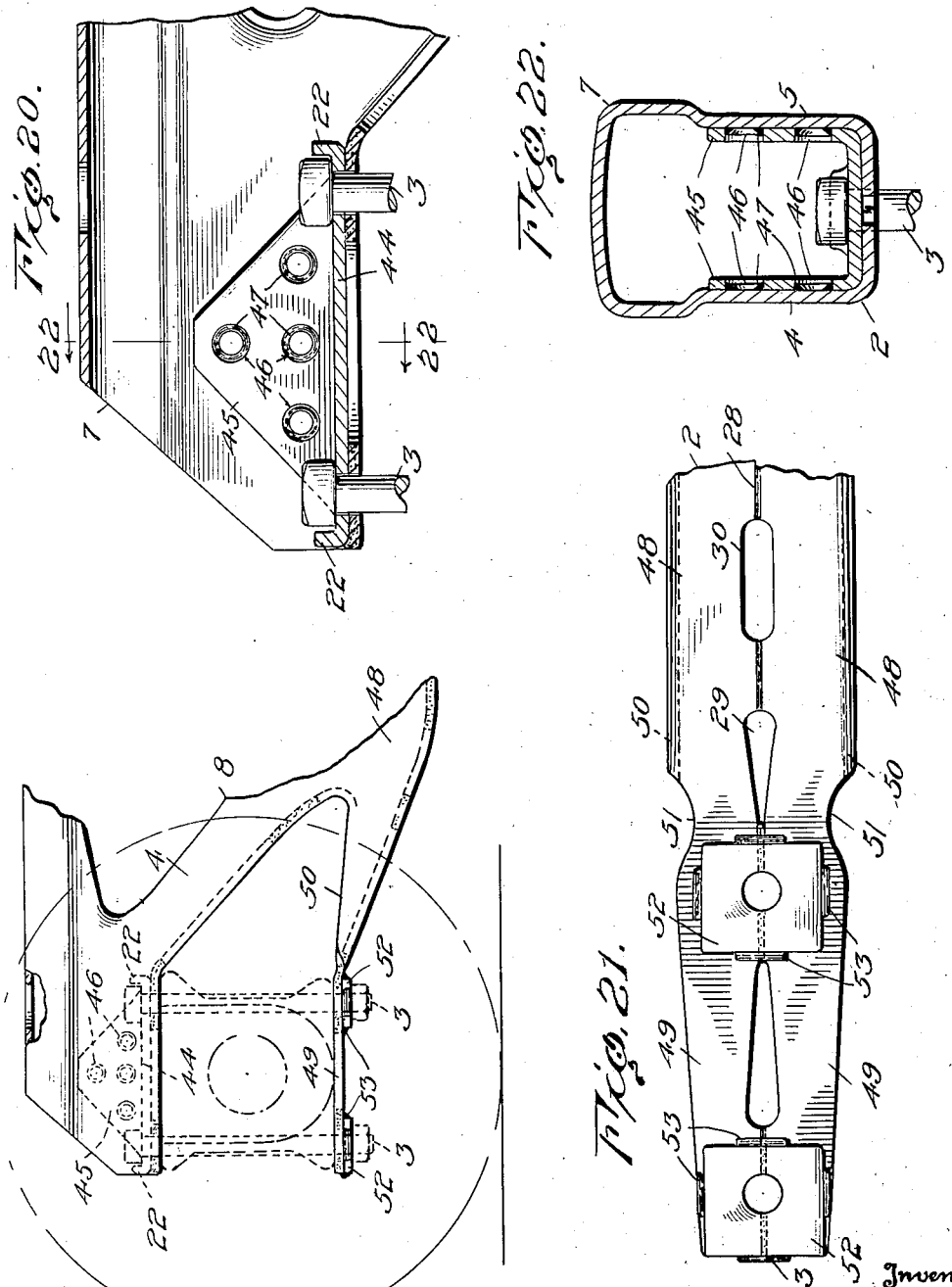

Patented Mar. 31, 1925.

1,531,639

UNITED STATES PATENT OFFICE.

GUSTAF ARVID ANDERSON, OF BALTIMORE, MARYLAND, ASSIGNOR, BY MESNE ASSIGNMENTS, TO THE SYMINGTON COMPANY, A CORPORATION OF MARYLAND.

CAR-TRUCK SIDE FRAME.

Application filed October 17, 1922. Serial No. 595,100.

*To all whom it may concern:*

Be it known that I, GUSTAF ARVID ANDERSON, a citizen of the United States, residing at Baltimore, in the State of Maryland, have invented certain new and useful Improvements in Car-Truck Side Frames; and I do hereby declare the following to be a full, clear, and exact description of the invention, such as will enable others skilled in the art to which it appertains to make and use the same.

My invention relates to the construction of side frames for car trucks, and has for its object to produce a strong and comparatively light structure capable of being manufactured from reliable material.

The principal feature of the invention consists in constructing a side frame with a sheet metal outer wall and a sheet metal inner wall spaced with relation thereto, and in providing a sheet metal compression member of greater width than the adjacent portion of the frame constituted by the inner and outer walls and which is adapted to extend over the journal boxes of the car truck, the said compression member and the said inner and outer walls together forming a continuous sheet.

A further feature of the invention consists in forming the truck side frame with a sheet metal outer wall, a sheet metal inner wall spaced with relation thereto, and a sheet metal compression member by which said walls are integrally united, the compression member being dapted to extend over the journal boxes of the truck, and the inner and outer walls each having a bolster opening flanked by truck column portions which are united at their upper ends by the said compression member, each truck column portion being provided adjacent the compression member with a stiffening flange bordering the bolster opening and extending toward a corresponding flange with which the opposite wall of the frame is provided, and the said compression member being of greater width than the truck columns in the planes of said stiffening flanges.

A still further feature of the invention consists in forming a car truck side frame with a sheet metal inner wall and a sheet metal outer wall spaced with relation to each other, each of said walls having a bolster opening intervening between truck column portions formed from their respective walls and integrally connected at their lower ends by a portion of the corresponding wall, the said columns and their respective connecting portions being provided with stiffening flanges bordering the bolster opening, and the stiffening flanges of each column being merged into the stiffening flange of the said connecting portion through a compound curve.

Another feature of the invention consists in forming a car truck side frame with a sheet metal outer wall and a sheet metal inner wall each having portions adapted to extend over the journal boxes of the truck, and in combining therewith reinforcing members interposed between and secured to the walls of the frame above the respective journal boxes, each of the reinforcing members having a plurality of openings respectively adjacent to and covered by the said walls, and the said walls being welded to the reinforcing members by metal located in the openings of the latter.

A still further feature of the invention consists in providing a car truck side frame with a sheet metal outer wall and a sheet metal inner wall having portions adapted to extend over respective journal boxes, and in combining therewith sheet metal reinforcing members interposed between and secured to the said walls above the corresponding journal boxes, the reinforcing members being fashioned from substantially square blanks having openings for journal box bolts and having opposite corners bent upwardly so as to stand parallel with the respective walls of the frame and having the remaining opposite corners bent upwardly to constitute nut locks for the journal box bolts.

Another feature of the invention consists in forming a car truck side frame having a bolster opening therein with a sheet metal outer wall and a sheet metal inner wall, and in providing a pedestal tie bar portion extending beneath the bolster opening and connecting the lower ends of the journal boxes, the said pedestal tie bar portion being tapered beneath the journal boxes so as to widen inwardly from its outer ends and being provided between said journal boxes with upwardly extending stiffening flanges.

A still further feature of the invention consists in forming a car truck side frame with a sheet metal outer wall and a sheet metal inner wall, and in providing brake hanger brackets each of which is formed with a flange bearing upon the exterior of the said inner wall and with a spindle projecting through said inner wall and engaging the inner face of the outer wall, means being provided for maintaining the end of the said spindle in contact with the outer wall.

There are other features of the invention residing in particular combinations and special details of construction, all as will hereinafter appear.

In the drawings illustrating the invention, the scope whereof is pointed out in the claims,—

Figure 1 is a side elevation of a car truck side frame embodying the invention, the journal boxes and wheels of the truck being illustrated in dotted lines and portions of the brake hangers being broken away.

Figure 2 is an inverted plan view of one half of the lower portion of the truck side frame shown in Fig. 1, parts of the spring plank and spring plank seat also being illustrated.

Figure 3 is a view illustrating the sheet metal blank employed in producing the side frame shown in Fig. 1.

Figure 4 is a plan view of a portion of one end of the side frame shown in Fig. 1.

Figure 5 is a detail vertical section of one end of the side frame, the view being taken on the line 5—5, Fig. 4.

Figure 6 is a section on the line 6—6, Fig. 1, a portion of the bolster chafing plate and a portion of the spring plank being broken away.

Figure 7 is a detail sectional view on the line 7—7, Fig. 1.

Figure 8 is a detail sectional view on the line 8—8, Fig. 1.

Figure 9 is a detail sectional view on the line 9—9, Fig. 1.

Figure 10 is a detail sectional view on the line 10—10, Fig. 1.

Figure 11 is a detail view, partly in section and partly in elevation, showing one of the brake hanger brackets and its relation to the side frame.

Figure 12 is a detail side elevation of one of the brake hanger brackets.

Figure 13 is a detail view, partly in plan and partly in horizontal section, illustrating the outer end of one of the brake hanger brackets and a portion of the outer wall of the side frame.

Figure 14 is a detail sectional view on the line 14—14, Fig. 11.

Figure 15 is a detail sectional view on the line 15—15, Fig. 11.

Figure 16 is a detail side elevation of a portion of a car truck side frame embodying a modified form of the invention.

Figure 17 is a detail sectional view on the line 17—17, Fig. 16.

Figure 18 is a view corresponding to Fig. 17 but illustrating still another form of the invention.

Figure 19 is an elevational view of one end of a car truck side frame embodying a modified form of the invention, portions of the side frame being broken away and the neighboring wheel and journal box of the truck being shown in dotted lines.

Figure 20 is a detail vertical section of the construction shown in Fig. 19.

Figure 21 is an inverted plan view of the end portion of the truck side frame shown in Fig. 19.

Figure 22 is a detail sectional view on the line 22—22, Fig. 20.

In the drawings, 1 indicates the journal boxes and 2 is the side frame of a car truck, the journal boxes being connected to said frame in a well known manner by means of journal box bolts 3.

The side frame is formed from a single continuous sheet of metal and comprises an outer wall 4 and an inner wall 5 spaced with respect to each other. The sheet from which the side frame is formed is preferably a wrought steel plate having the form or outline of the blank illustrated in Fig. 3, the original shape of the blank prior to the production of the stiffening flanges being indicated in full lines and the stiffening flanges, which are subsequently produced by bending, being indicated by dotted lines.

Each of the walls 4 and 5 of the side frame is provided with registering bolster openings flanked by a plurality of oppositely disposed truck column portions 6. These truck column portions are united at their upper ends by a sheet metal compression member 7 which extends over the journal boxes 1 and integrally unites the inner and outer walls of the side frame. The inner and outer walls of the frame are also provided with a plurality of bottom arch bar portions 8 and pedestal tie bar portions 9, the latter extending beneath the journal boxes and being connected thereto by the journal box bolts 3. The compression member 7 is of bulbous cross section, being thus capable of being conveniently made of greater width than the adjacent portion of the side frame constituted by the inner and outer walls, 4 and 5, respectively, and thereby affording increased strength and rigidity in this portion of the side frame without a correspondingly increased spacing of the side walls of the frame.

The sides of the truck column portions 6 adjacent the bolster opening are bordered by stiffening flanges 10 which preferably merge into and are connected at their upper ends by stiffening flanges 11 projecting toward each other from opposite sides of the side frame at the upper end of the bolster opening. The flanges 10 of the truck columns merge into connecting flanges 12 which border the lower end of the bolster opening and stiffen the portions of the inner and outer walls by which the lower ends of the truck columns are integrally united. The mergence of the flanges 10 of the columns into the corresponding stiffening flanges 12 at the base of the bolster opening is preferably effected through a compound curving of the flanges at their respective points of junction, the radius of curvature of the portion of the merging curve which is adjacent a flange 12 being greater than the radius of curvature of the portion of the compound curve adjoining the connected flange 10. By this means the depth of section of metal is increased at the critical points where the truck columns are united at their lower ends by the portion of the side frame beneath the bolster opening. The lower face 13 of the spring plank seat 14, which rests upon the flanges 12 between the truck columns, also is preferably formed with corresponding compound curves at its opposite ends, and the spring plank 15 likewise is preferably curved to conform to the mergence curves of the stiffening flanges 10 and 12.

The portions of the stiffening flanges 10 adjacent the upper ends of the truck columns are overlapped by bolster chafing plates 16 which are electrically welded to the truck column portions 6 of the inner and outer walls of the frame, as indicated at 17. The opposed corresponding flanges 10 and 12 are united by welds 18 as also are the stiffening flanges 19 at the lower sides of the lower arch bar portions 8.

The portions of the side frame extending over the journal boxes 1 are strengthened by reinforcing members 20 positioned between and secured to the walls 4 and 5 of the frame. Each reinforcing member 20 is preferably formed from a substantially square sheet metal blank whose opposite corners 21 are bent upwardly so as to stand adjacent and parallel to the respective walls of the side frame, and the remaining opposite corners of which are also bent upwardly to form nut locks 22 for cooperating with the journal box bolts 3. The reinforcing members 20 are preferably welded to the side frame by the electric welds 23 (see Figs. 4 and 5) connecting the stiffening flanges of the side frame on opposite sides of the upper ends of the journal box bolts 3. The side portions 21 of the reinforcing members are formed with welding openings 24 which are overlaid by the respectively adjacent walls 4 and 5 of the side frame. Welding metal 25 deposited in the openings 24 serves rigidly to secure the reinforcing members to the walls of the side frame. By this means any weakening of the metal of the inner and outer walls of the side frame due to electric welding at the openings 24 is substantially confined to areas approximately equal to those of the rivet holes which otherwise would be required to be punched in the side walls if the reinforcing members 20 were riveted to the walls of the side frame instead of being welded thereto. Critical points of weakness in the walls of the side frame are thus eliminated. The members 20 preferably are also secured to the walls of the side frame by metal 26 welding said side walls to the edges of the side portions 21 of said reinforcing members.

The inturned flanges 27, which are respectively integral with the outer wall 4 and inner wall 5 of the side frame and which constitute the bottom of the pedestal tie bar, are rigidly united by being electrically welded to each other at various points along their abutting edges, said welds being indicated by 28. Between these welds suitable drainage openings, such as 29 and 30, are provided for the escape of moisture which otherwise might collect and cause deterioration of the side frame. The openings 29 may advantageously be tapered toward the corresponding inner journal box bolts, thus increasing the strength of the pedestal tie at points where great strength is desired. At their outer ends the flanges 27 widen inwardly, thus causing the portions of the pedestal tie bar beneath the journal boxes to increase in width inwardly toward the respectively adjacent inner journal box bolts 3. Between the journal boxes the tie bar portions are provided with upwardly extending tapered stiffening flanges 31 which gradually increase in depth from points adjacent the inner sides of the journal boxes toward the bolster opening of the side frame.

The tapered portions of the flanges 27 are rigidly connected by reinforcing plates 32 having apertures for the passage of the journal box bolts 3. These plates, which are preferably square, may advantageously be secured to the pedestal tie bar portions of the side frame by independent welds 33 disposed at the marginal edges of the said reinforcement plates 32. The welds 28 adjacent the openings for the journal box bolts not only serve to connect the tapering flanges 27 at these points, but preferably also serve as a means for uniting the reinforcement plates to the said flanges.

The brake hanger brackets 34 preferably employed each comprises a flange 35 from one side of which a stud or spindle 36 projects. The flange 35 bears firmly against the exterior of the inner wall 5 of the side frame and is preferably secured thereto by means of rivets 37, while the spindle 36 extends through said inner wall and engages the inner face of the outer wall 4, thereby assisting in maintaining the spaced relation of the said walls. The spindle 36 is provided at its outer end with a rivet 38 which projects through the outer wall 4 and constitutes means for securing the brake hanger bracket thereto. This rivet, the original shape of which is indicated by dotted lines in Fig. 11, is secured in place by casting the bracket 34 around it, the said bracket being provided with a cored hole 39 which represents the position of the core utilized to support the inner end of the rivet so as to prevent it from settling and being thrown out of line in the mold.

In the modification of my invention illustrated in Figs. 16 and 17, the contour of the truck column portions 40 of the inner and outer walls of the side frame is somewhat different from the configuration of the truck column portions 6 heretofore described, the substantial difference being that, in the modified construction, the portions of the truck columns against which the bolster chafing plates 41 bear are curved through a greater distance. This enables the truck column portions 40 to be readily associated with chafing plates 41 of different width as occasion may require, thus permitting a single set of dies to be utilized in the production of the side frame whether the bolster to be employed in the truck is designed to cooperate with the commonly used six inch chafing plates or with those of seven inch width.

Fig. 18 illustrates a modified form of truck column construction which may advantageously be employed where a comparatively narrow chafing plate 42 is to be used. This form of construction is well suited for adoption where the truck column portions 43 form parts of a side frame whose general width is but slightly greater than that of the chafing plate 42.

Except as otherwise stated, the modified form of the invention illustrated in Figs. 19 to 22, inclusive, may conform to the constructions heretofore described, and accordingly similar details of construction are indicated by corresponding reference numerals. The reinforcing members 44 which are interposed between and secured to the outer wall 4 and the inner wall 5 of the side frame above the journal boxes 1, like the reinforcing members 20, are formed from substantially square blanks of sheet metal bent upwardly at their corners in the manner and for the purpose already described. Each of the side walls 45 of these reinforcing members is formed with a plurality of openings 46, the said openings being covered by neighboring portions of the respective side walls of the frame. The reinforcements are secured in place between the side walls of the frame by welding around the inner edges of the openings 46, as indicated at 47. The welds 47, as will be perceived, are annular in form and do not completely fill the openings 46 in the reinforcing members, thereby minimizing any weakening of the metal in the walls of the side frame due to the electric welding.

The pedestal tie bar portions 48 also differ somewhat from those embodied in the previously described form of my invention. They are provided with inwardly tapering flanges 49 and with upwardly extending tapered stiffening flanges 50, substantially corresponding, respectively, to the flanges 27 and 31 of the structure shown in the principal figures of the drawings, but are formed with oppositely disposed circular cuts or recesses 51 just inwardly of the inner journal box reinforcements 52. These circular cuts facilitate the turning up of the tapering stiffening flanges 50. The reinforcing plates 52 may be secured to the pedestal tie bar flanges 49 by electric welds 53 positioned like those employed for attaching the reinforcing members 32. Other features of construction disclosed in Figs. 19 to 22 are substantially like those heretofore described and, therefore, are indicated by corresponding reference numerals.

A car truck side frame constructed in accordance with my invention is comparatively light in weight and of great strength, the material of which it is constructed not only being of a reliable nature but also being disposed so that the critical points of strain of the side frame are amply able to sustain the loads and shocks to which they are subjected in service.

I claim:—

1. A car truck side frame involving a sheet metal outer wall, a sheet metal inner wall spaced with relation thereto, and a sheet metal compression member integrally uniting said walls and adapted to extend over the journal boxes of a car truck, the said compression member being of greater width than the adjacent portion of said frame constituted by said inner and outer walls.

2. A car truck side frame having truck columns adapted to receive a bolster between them, said frame involving a sheet metal outer wall, a sheet metal inner wall spaced with relation thereto, and a sheet metal compression member integrally uniting said walls and adapted to extend over the journal boxes of a car truck, each of said walls having a bolster opening flanked by a plurality of truck column portions, said column portions being united at their upper ends by said compression member and each being provided adjacent its upper end with a stiffening flange bordering its bolster opening and extending toward the opposite wall of said frame, said truck columns in the planes of said stiffening flanges being of less width than said compression member.

3. A car truck side frame involving a spring plank seat, a sheet metal outer wall, a sheet metal inner wall spaced with relation to said outer wall, and a sheet metal compression member integrally uniting said walls and adapted to extend over the journal boxes of a car truck, each of said walls having a bolster opening flanged by truck column portions formed from the respective walls and integrally connected at their lower ends by a portion of the corresponding wall, the bolster opening of each wall being in the form of a compound curve at the junctions of said truck columns with the portions of said walls by which the lower ends of said columns are respectively united, and said spring plank seat having a corresponding compound curved face.

4. A car truck comprising a plurality of side frames each having a bolster opening therein, a plurality of spring plank seats respectively carried by said side frames, and a spring plank bearing upon said spring plank seats and extending between said side frames, each of said side frames involving a sheet metal outer wall and a sheet metal inner wall, each of said walls having truck column portions integrally united at their lower ends by a portion of the corresponding wall extending beneath an adjacent one of said spring plank seats, the bolster openings of said side frames being formed with compound curves at the junctions of said column portions with the portions of said walls uniting the lower ends of said columns, the lower side of each of said spring plank seats being formed with corresponding compound curved faces, and said spring plank being formed adjacent said truck columns with compound curved faces.

5. A car truck side frame involving a sheet metal outer wall and a sheet metal inner wall, each of said walls having portions adapted to extend over respective journal boxes, and reinforcing members located between and secured to said walls above the respective journal boxes, said reinforcing members being provided with a plurality of openings and being secured to said walls by metal welded to the marginal walls of said openings and to the respectively adjacent walls of the side frame.

6. A car truck side frame involving a sheet metal outer wall and a sheet metal inner wall, each of said walls having portions adapted to extend over respective journal boxes, and reinforcing members located between and secured to said walls above the respective journal boxes, said reinforcing members being provided with a plurality of openings which are respectively adjacent to and are covered by the said walls, and said reinforcing members being welded to said walls by metal located in said openings.

7. A rectangular reinforcing plate for car truck side frames having the corners thereof bent from one side of the plate, certain of said corners forming attaching means for the plate and other of said corners acting to provide means to prevent the rotation of the journal box bolts.

8. A car truck side frame involving a sheet metal outer wall and a sheet metal inner wall, each of said walls having portions adapted to extend over respective journal boxes, and reinforcing members located between and secured to said walls above the respective journal boxes, each of said reinforcing members being formed from a substantially square blank of sheet metal provided with spaced openings along a diagonal thereof, said openings being adapted to receive journal box bolts and having its opposite ends bent upwardly so as to stand adjacent to and parallel with the respective walls of said frame.

9. A car truck side frame involving a sheet metal outer wall and a sheet metal inner wall, each of said walls having portions adapted to extend over respective journal boxes, and reinforcing members located between and secured to said walls above the respective journal boxes, said reinforcing members being formed of a substantially square blank of sheet metal having openings adapted to receive journal box bolts and having opposite corners bent upwardly to stand adjacent to and parallel with the respective walls of said frame and having the remaining opposite corners bent upwardly to form nutlocks for said bolts.

10. A car truck side frame having a bolster opening therein and being provided with a pedestal tie bar portion extending beneath said bolster opening and adapted to connect journal boxes associated with the side frame, the said pedestal tie bar portion being tapered beneath said journal boxes so as to widen inwardly from its outer ends and said tie bar portion being provided between said journal boxes with upwardly extending stiffening flanges.

11. A car truck side frame having a bolster opening therein and being provided with a pedestal tie bar portion extending beneath said bolster opening and adapted to connect journal boxes associated with the side frame, said pedestal tie bar portion being tapered beneath said journal boxes so as to widen inwardly from its outer ends and said tie bar portion being provided between said journal boxes with upwardly extending tapered stiffening flanges.

12. A car truck side frame involving a sheet metal outer wall and a sheet metal inner wall, each of said walls being formed with an opening and with a pedestal tie bar portion adapted to connect journal boxes associated with the side frame, said pedestal tie bar portions being tapered beneath said journal boxes so as to widen inwardly from their outer ends.

13. A car truck side frame having a bolster opening therein and provided with a pedestal tie bar portion extending beneath said bolster opening and adapted to be connected by means of bolts to journal boxes associated with the side frame, said pedestal tie bar portion being formed for a part of its length with spaced side walls and a bottom wall connecting said side walls, the said bottom wall being constituted by flanges forming stiffeners for the respective side walls and being united to each other by welding, and the said bottom wall being formed adjacent the respective journal boxes with tapering openings which decrease in width toward the adjacent journal box bolts.

14. A car truck side frame having a bolster opening therein and provided with a pedestal tie bar portion extending beneath said bolster opening and adapted to connect journal boxes associated with said side frame, said pedestal tie bar portion being formed for a part of its length with spaced side walls and a bottom wall connecting said side walls, said bottom wall being tapered beneath the journal boxes so as to widen from its outer ends inwardly, said bottom wall being constituted by flanges forming stiffeners for said side walls and being provided adjacent the respective journal boxes with tapering openings decreasing in width towards the respectively adjacent journal boxes.

15. A car truck side frame involving a sheet metal outer wall and a sheet metal inner wall, each of said walls having a bolster opening and being provided with a pedestal tie bar portion adapted to extend beneath and connect journal boxes associated with the side frame, and reinforcing members rigidly connecting the corresponding tie bar portions of said outer and inner walls, said reinforcing members being provided with openings adapted to receive journal box bolts for connecting said journal boxes to the side frame.

16. A car truck side frame involving a sheet metal outer wall and a sheet metal inner wall in spaced relation thereto, each of said walls being provided with a pedestal tie bar portion adapted to extend beneath journal boxes associated with the side frame, and spaced reinforcing members rigidly uniting corresponding tie bar portions of said outer and inner walls, said reinforcing members being provided with openings adapted to receive journal box bolts for securing the journal boxes to the side frame, and said reinforcing members being welded to the lower side of said pedestal tie bar portions by independent welds.

17. A car truck side frame involving a sheet metal outer wall, a sheet metal inner wall spaced with relation thereto, each of said walls having a plurality of truck column portions and having flanges located between said walls and respectively bordering said truck column portions, and bolster chafing plates respectively secured to adjacent flanges and constituting means for connecting said walls, said column portions being bulged in opposite directions so as to project laterally beyond the ends of the said chafing plates.

18. A car truck side frame involving a sheet metal outer wall and a sheet metal inner wall, each of said walls having bolster openings and being formed with portions adapted to extend over respective journal boxes, and brake hanger brackets carried by said side frame on opposite sides of said bolster openings, each of said brackets having a flange bearing upon the exterior of said inner wall and having a spindle extending through said inner wall and engaging the inner face of said outer wall, and having means for maintaining the end of said spindle in contact with said outer wall.

19. A car truck side frame involving a sheet metal outer wall, a sheet metal inner wall spaced from said outer wall, each of said walls having a bolster opening and being provided with a top arch bar portion adapted to extend over respective journal boxes, and a plurality of brake hanger brackets connecting the said walls, each of said brackets comprising a flange adapted to bear against the exterior face of said inner wall, a spindle projecting through said inner wall, and a rivet cast in place in said spindle and constituting means for securing said bracket to said outer wall.

20. A car truck side frame having a pedestal tie bar adapted to extend beneath and connect journal boxes associated with said frame, and having reinforcing members rigidly secured to said pedestal tie bar, said reinforcing members being provided with openings respectively adapted to receive journal box bolts for connecting said journal boxes to the side frame.

21. A car truck side frame involving a sheet metal outer wall and a sheet metal inner wall in spaced relation thereto, each of said walls being provided with a pedestal tie bar portion adapted to extend beneath journal boxes associated with the side frame, and reinforcing members rigidly uniting corresponding tie bar portions of said outer and inner walls adjacent the inner sides of the respective journal boxes, said reinforcing members being provided with openings respectively adapted to receive journal box bolts for securing the journal boxes to the side frame, and said reinforcing members being secured to the lower side of said pedestal tie bar portions by welds spaced from the outer edges of said tie bar portions.

22. A car truck side frame involving a sheet metal outer wall and a sheet metal inner wall, each of said walls having portions adapted to extend over respective journal boxes, and reinforcing members located between and secured to said walls above the respective journal boxes, said reinforcing members having side walls disposed adjacent the respective walls of said frame, the side walls of one of the connected parts being provided with an opening which is filled with welding material whereby said reinforcing members are connected to said frame.

23. A car truck side frame involving a sheet metal outer wall, a sheet metal inner wall spaced with relation thereto, and a sheet metal compression member connected to said walls and adapted to extend over the journal boxes of a car truck, the said compression member being of greater width than the adjacent portion of said frame constituted by said inner and outer walls.

In testimony whereof I affix my signature.

GUSTAF ARVID ANDERSON.